United States Patent [19]  
Hannah, Jr.

[11] Patent Number: 5,531,239  
[45] Date of Patent: Jul. 2, 1996

[54] RECREATIONAL VEHICLE AWNING TIGHTENER

[76] Inventor: Delbert R. Hannah, Jr., 56 McKinley Pl. North, St. Cloud, Minn. 56303

[21] Appl. No.: 446,952
[22] Filed: May 15, 1995
[51] Int. Cl.⁶ .............................. E04F 10/00; B25B 25/00
[52] U.S. Cl. .................. 135/88.1; 135/88.01; 135/88.12; 135/117; 135/120.2; 135/120.4; 294/19.1; 52/DIG. 1; 52/166; 52/146
[58] Field of Search .................................. 294/19.1, 82.1, 294/1.1; 52/166, 146, DIG. 1; 135/87, 88.01, 88.1, 88.12, 90, 117, 119, 120.2, 120.4, 903

[56] References Cited

U.S. PATENT DOCUMENTS

| | | | |
|---|---|---|---|
| 1,007,019 | 10/1911 | Wright | 294/26 X |
| 1,557,985 | 10/1925 | Condra | 254/1 |
| 2,454,611 | 10/1995 | Wanat | 294/19.1 X |
| 2,835,154 | 5/1958 | Geller | 24/68 D X |
| 3,834,400 | 9/1974 | Sattler | 135/88.12 |
| 3,918,510 | 11/1975 | Hayward | 135/119 X |
| 3,923,074 | 12/1975 | McKee | 135/903 X |
| 3,936,088 | 2/1976 | Williams | 294/19.1 |
| 4,264,055 | 4/1981 | Strange | 254/243 |
| 4,953,903 | 9/1990 | Warner | 294/1.1 |

Primary Examiner—Wynn E. Wood

[57] ABSTRACT

A recreational vehicle awning tightener including a generally planar rigid plate sized for receiving a user's foot thereon, the plate having an upper surface and a lower surface bounded by a front edge, a back edge, and a pair of side edges extended therebetween and with the rear edge of the plate positionable upon a recipient surface and the front edge extended upwards to thereby create an acute angle between the lower surface and the recipient surface; a hook removably couplable to an outboard portion of a cover of an awning; and a generally taut line having one end coupled to the hook and another end coupled to the plate, whereby when the user's foot is placed upon the plate and then applies a downward force, the hook pulls the outboard portion of the cover of the awning downwards.

1 Claim, 4 Drawing Sheets

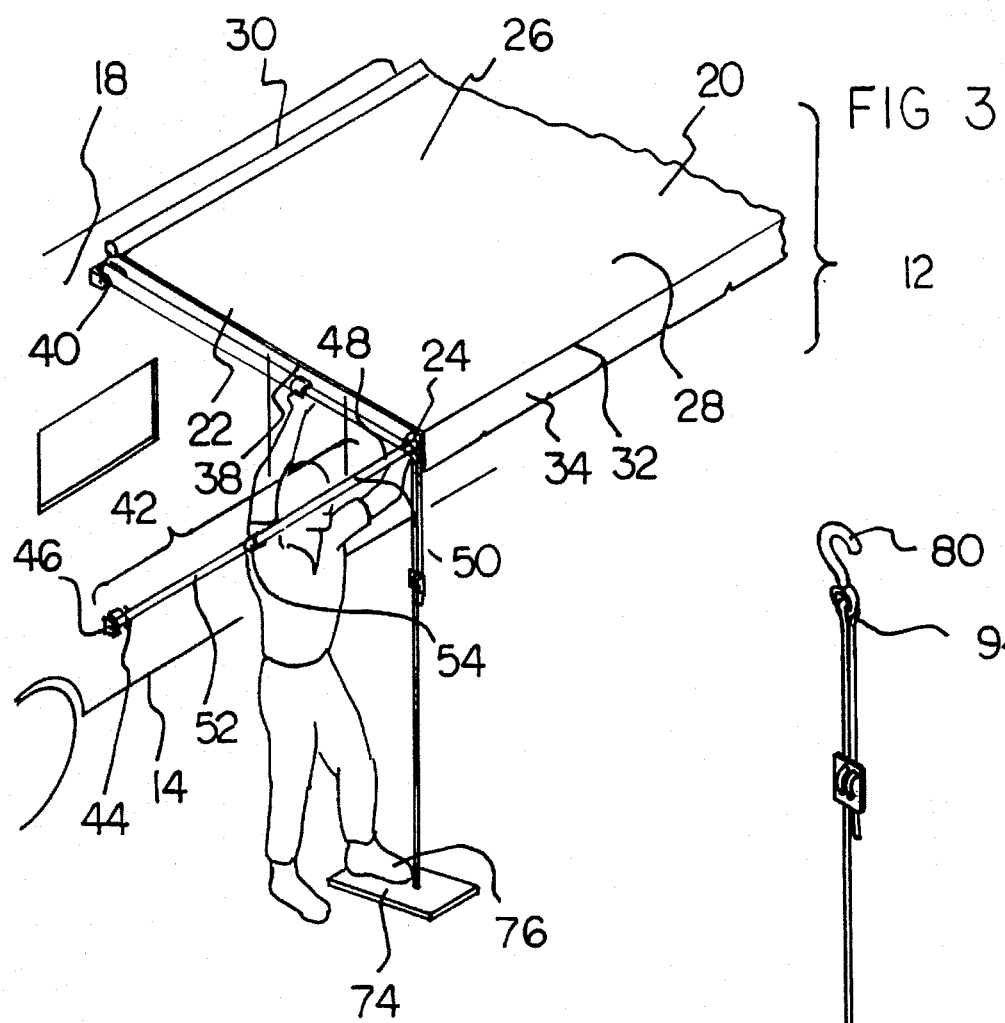
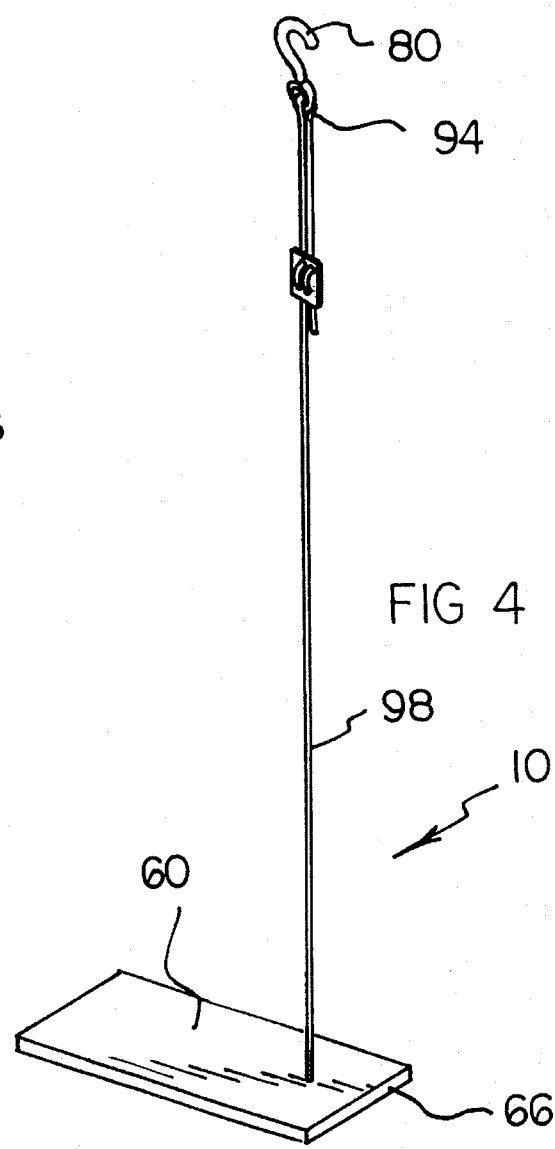

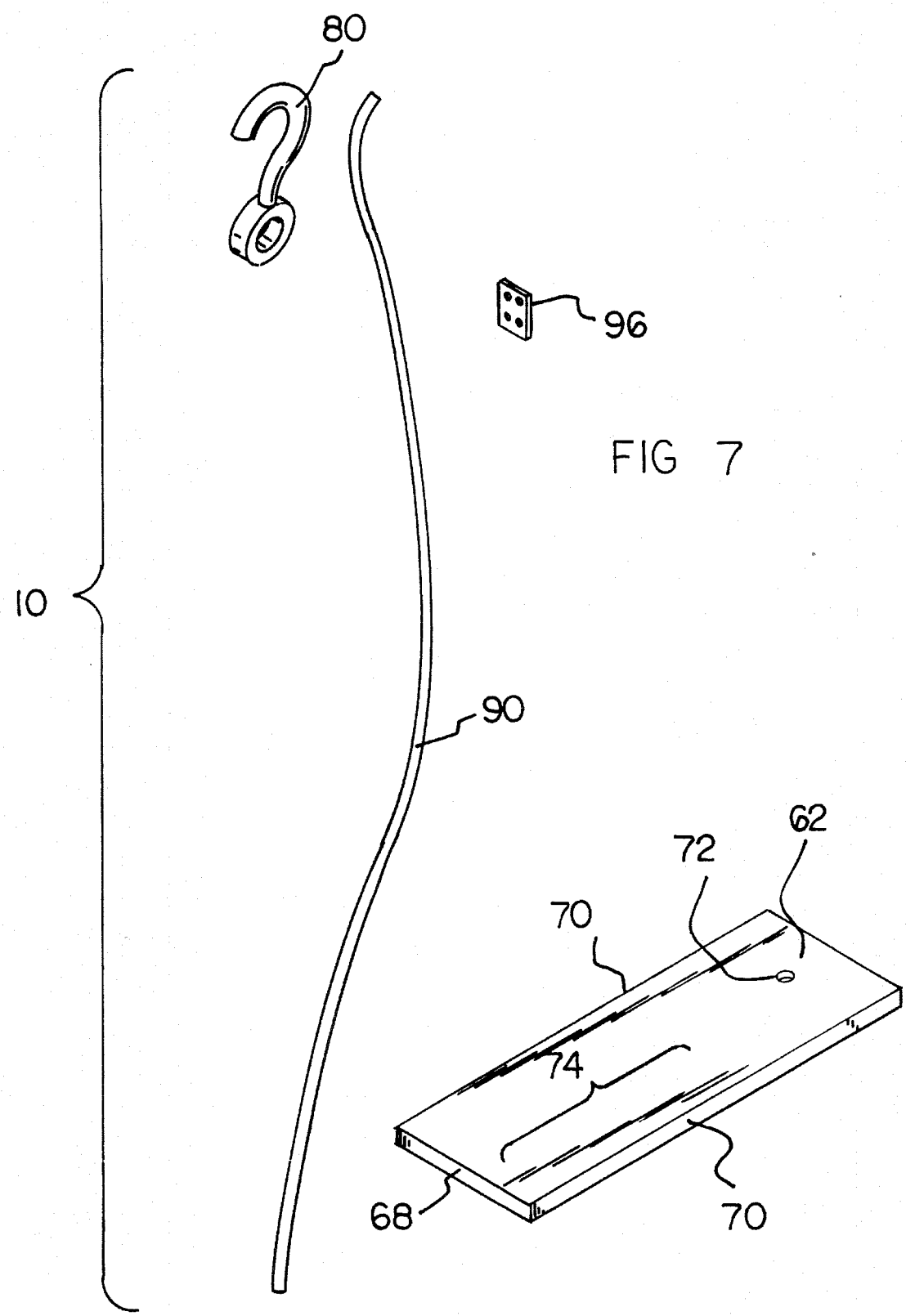

5,531,239

RECREATIONAL VEHICLE AWNING TIGHTENER

BACKGROUND OF THE INVENTION

1. Field of the Invention

The present invention relates to a recreational vehicle awning tightener and more particularly pertains to tightening an awning used on a recreational vehicle to a position for use with a recreational vehicle awning tightener.

2. Description of the Prior Art

The use of awning adjustment mechanisms is known in the prior art. More specifically, awning adjustment mechanisms heretofore devised and utilized for the purpose of adjusting an awning for use are known to consist basically of familiar, expected and obvious structural configurations, notwithstanding the myriad of designs encompassed by the crowded prior art which have been developed for the fulfillment of countless objectives and requirements.

By way of example, U.S. Pat. Des. No. 312,771 to Pelletier discloses a recreational vehicle awning support adapter. U.S. Pat. No. 4,727,897 to Watts discloses a stabilizing bracket for an awning of a recreational vehicle. U.S. Pat. No. 4,801,119 to Pelletier discloses an awning support for recreational vehicles. U.S. Pat. No. 4,821,987 to Haman discloses a recreational vehicle awning support truss and system. U.S. Pat. No. 5,192,111 to Hanemaayer discloses a built-in awning for a recreational vehicle.

While these devices fulfill their respective, particular objective and requirements, the aforementioned patents do not describe a recreational vehicle awning tightener that is simple in design and allows an awning on a recreational vehicle to be placed into use through the effort of only one person.

In this respect, the recreational vehicle awning tightener according to the present invention substantially departs from the conventional concepts and designs of the prior art, and in doing so provides an apparatus primarily developed for the purpose of tightening an awning used on a recreational vehicle to a position for use.

Therefore, it can be appreciated that there exists a continuing need for new and improved recreational vehicle awning tightener which can be used for tightening an awning used on a recreational vehicle to a position for use. In this regard, the present invention substantially fulfills this need.

SUMMARY OF THE INVENTION

In the view of the foregoing disadvantages inherent in the known types of awning adjustment mechanisms now present in the prior art, the present invention provides an improved recreational vehicle awning tightener. As such, the general purpose of the present invention, which will be described subsequently in greater detail, is to provide a new and improved recreational vehicle awning tightener and method which has all the advantages of the prior art and none of the disadvantages.

To attain this, the present invention essentially comprises, in combination, a recreational vehicle positioned upon a recipient surface and with the recreational vehicle having an upstanding supporting surface thereon. An awning is also provided. The awning includes a generally rectangular cover having an inboard extent and an outboard extent bounded by an inboard portion, an outboard portion, and a pair of opposed side edges extended therebetween and with the inboard portion thereof coupled to the supporting surface of the recreational vehicle at an upper extent thereof. The awning also includes a telescopically adjustable elongated truss having an inboard end removably coupled to the supporting surface of the recreational vehicle at a lower extent thereof, an outboard end removably coupled to an outboard portion of the cover, and an adjustment knob therebetween.

A rectangular planar rigid plate is included and has an upper surface, a lower surface, and a periphery interconnecting the surfaces formed of a short front edge, a short back edge, and a pair of opposed long side edges extended therebetween. The plate further has a central axis formed therethrough. The central axis is extended perpendicularly between the front edge and the back edge. The plate additionally has a characteristic thickness, a width that is at least ten times greater than the thickness, a length that is at least 36 times greater than the thickness, and a through hole formed thereon at a location aligned with the central axis. The through hole is offset toward the front edge of the plate to thereby define a stepping area upon the upper surface between it and the rear edge. The rear edge of the plate is positioned upon the recipient surface and the front edge of the plate extended upwards to thereby create an acute angle between the lower surface and the recipient surface. A rigid hook is included and has a curved upper extent and a lower extent with an eyelet formed thereon. The upper extent of the hook is removably coupled to an outer portion of the cover of the awning. Lastly, a piece of flexible non-extendable rope is disposed within the through hole of the plate. The rope has a knot at one end positioned in contact with the lower surface of the plate, a loop formed at the other end coupled with the eyelet of the hook, and an intermediate taut portion therebetween. When a user's foot is placed upon the stepping area and then applies a downward force, the hook pulls the outboard portion of the cover of the awning downwards for allowing telescopic adjustment of the truss.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved recreational vehicle awning tightener which has all the advantages of the prior art awning adjustment mechanisms and none of the disadvantages.

It is another object of the present invention to provide a new and improved recreational vehicle awning tightener which may be easily and efficiently manufactured and marketed.

It is a further object of the present invention to provide a new and improved recreational vehicle awning tightener which is of durable and reliable construction.

An even further object of the present invention is to provide a new and improved recreational vehicle awning tightener which is susceptible of a low cost of manufacture with regard to both materials and labor, and which accordingly is then susceptible of low prices of sale to the consuming public, thereby making such a recreational vehicle awning tightener economically available to the buying public.

Still yet another object of the present invention is to provide a new and improved recreational vehicle awning tightener which provides in the apparatuses and methods of the prior art some of the advantages thereof, while simultaneously overcoming some of the disadvantages normally associated therewith.

Even still another object of the present invention is to provide a new and improved recreational vehicle awning tightener for tightening an awning used on a recreational vehicle to a position for use.

Lastly, it is an object of the present invention to provide a new and improved recreational vehicle awning tightener comprising a generally planar rigid plate sized for receiving a user's foot thereon, the plate having an upper surface and a lower surface bounded by a front edge, a back edge, and a pair of side edges extended therebetween and with the rear edge of the plate positionable upon a recipient surface and the front edge extended upwards to thereby create an acute angle between the lower surface and the recipient surface; a hook removably couplable to an outboard portion of a cover of an awning; and a generally taut line having one end coupled to the hook and another end coupled to the plate, whereby when the user's foot is placed upon the plate and then applies a downward force, the hook pulls the outboard portion of the cover of the awning downwards.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective view of the preferred embodiment of the present invention in use for placing an awning in an operable configuration relative to the attached recreational vehicle.

FIG. 4 is a perspective view of the preferred embodiment in an extended configuration for use.

FIG. 7 is an exploded perspective view of the present invention.

The same reference numerals refer to the same parts through the various Figures.

DESCRIPTION OF THE PREFERRED EMBODIMENT

Figure 1:
FIG. 1 is a prior art awning used on a recreational vehicle.
Figure 2:
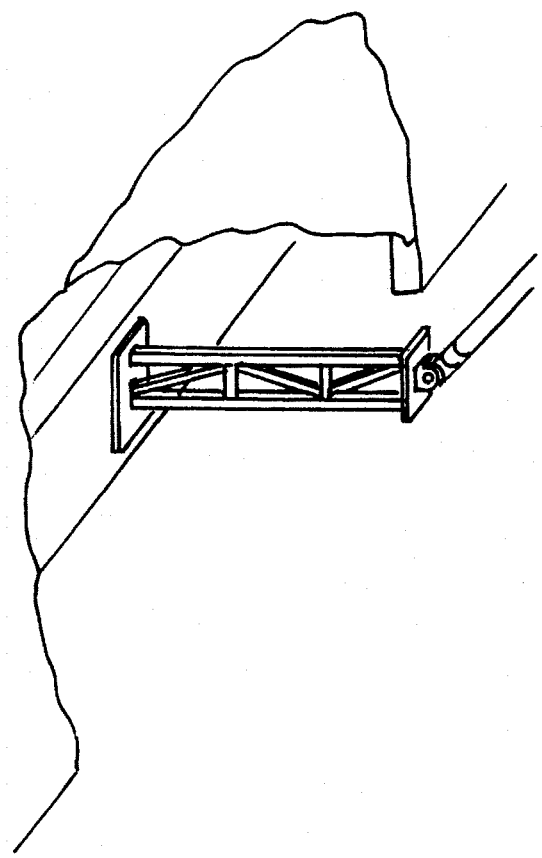
FIG. 2 is a prior art support bar for holding an awning in an elevated orientation from a recreational vehicle.

With reference now to the drawings, and in particular, to FIGS. 3 through 7 thereof, the preferred embodiment of the new and improved recreational vehicle awning tightener embodying the principles and concepts of the present invention and generally designated by the reference number 10 will be described.

The preferred embodiment of the present invention comprises a plurality of components. In their broadest context, such components include a plate, a hook, and a rope. Such components are individually configured and correlated with respect to each other to provide the intended function.

The present invention is adapted for use with an awning 12 secured to a recreational vehicle 14. The recreational vehicle is positioned upon a recipient surface 16. The recreational vehicle includes an upstanding supporting surface 18 thereon for supporting the awning.

The awning includes a generally rectangular cover 20. In the preferred embodiment, the cover is formed of a flexible sheet 22 formed of a waterproof cloth material such as canvas. The sheet can be wrapped around an elongated barrel rod 24 in a stowed configuration or extended therefrom in an operable configuration. The cover has an inboard extent 26 and an outboard extent 28. Extents 26, 28 are bounded by an inboard portion 30, an outboard portion 32 with a flange 34 extended downwards therefrom, and a pair of opposed side edges 38 extended therebetween. The inboard portion 30 is coupled to the supporting surface 18 of the recreational vehicle at an upper extent thereof with an elongated holding rod 40.

In addition, the awning includes a telescopically adjustable and elongated truss 42. The truss has an inboard end 44 removably coupled to the supporting surface 18 of the recreational vehicle at a lower extent thereof. This coupling is performed with a bracket 46. The truss also has an outboard end 48 removably coupled to the barrel rod 24 at the outboard portion of the cover. The truss is formed of an upper segment 50, a lower segment 52, and an adjustment knob 54 therebetween. The adjustment knob 54 can be loosened for allowing extension of the segments to increase the distance between the ends 44, 48. The adjustment knob 54 can then be tightened for setting a length for use.

Specifically, the present invention includes a plate 60. The plate is rectangular and planar in structure. It is formed of a rigid material. The plate has an upper surface 62, a lower surface 64, and a periphery interconnecting the surfaces. The periphery is formed of a short front edge 66, a short back edge 68, and a pair of opposed long side edges 70 extended therebetween. The plate includes a central axis extended therethrough. The central axis is perpendicularly extended between the front edge 66 and the back edge 68. The plate also has a characteristic thickness, a width that is at least 10 times greater than the thickness, and a length that is at least 36 times greater than the thickness.

Figure 5:
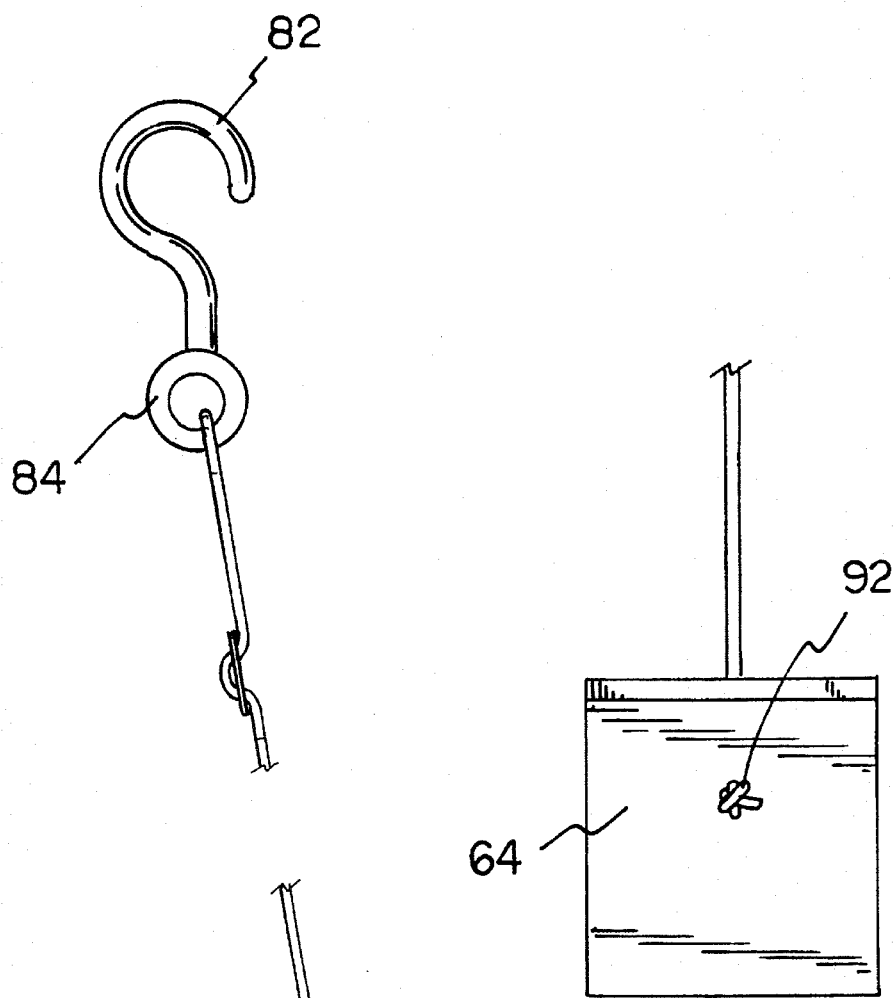
FIG. 5 is a side-elevational view of the preferred embodiment of the present invention.

The plate also includes a circular through hole 42 formed thereon. The through hole is aligned with the central axis and is offset toward the front edge to thereby define a stepping area 74 upon the upper surface. The stepping surface is positioned between the through hole and the rear edge and is sized for receiving a user's foot 76 thereon. As shown in FIG. 5, the rear edge 68 of the plate is positioned upon the recipient surface 16. The front edge 66 of the plate is extended upwards to thereby create an acute angle 78 between the lower surface 64 and the recipient surface. In this position, the present invention is ready for use.

A hook 80 is also included. The hook is rigid in structure. It has a curved upper extent 82 and a lower extent with an eyelet 84 formed thereon. The upper extent of the hook is removably coupled to the barrel rod 24 at the outer portion of the cover of the awning 20 as shown in FIG. 3.

Figure 6:
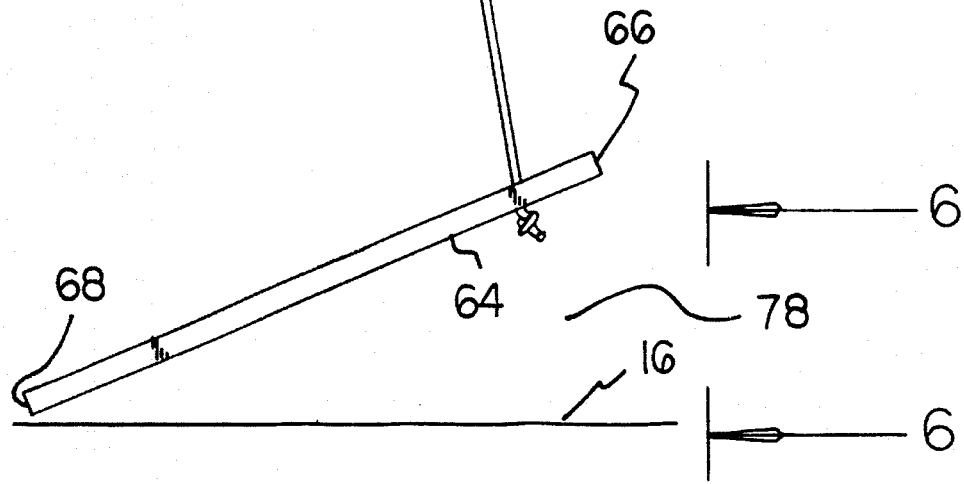
FIG. 6 is a view of the bottom surface of the plate of the present invention taken along the line 6—6 of FIG. 5.

Lastly, a piece of flexible and non-extendable rope 90 is provided. The rope is disposed within the through hole 72 of the plate. The rope has a knot 92 at one end positioned in contact with the lower surface 64 of the plate as shown in FIG. 6. A loop 94 is formed at the other end of the rope by a clamp 96. The loop is coupled with the eyelet 84 of the hook. Lastly, the rope includes an intermediate taut portion 98 extended between the ends. Now, when a user's foot 76 is placed upon the stepping area 74 as shown in FIG. 3, and a downward force is applied to the plate 60, the hook 80 pulls the barrel rod 24 located at the outboard portion of the cover of the awning downwards for allowing telescopic adjustment of the truss 42 by hand with adjustment knob 54.

The present invention is a device designed to help tighten the awnings used on recreational vehicles. The present invention consists of a small hook, a length of rope or cable, and a piece plate formed of wood or plastic. The rope or cable must be of a type that does not stretch. One end of the rope is attached to the hook, and the other end of the rope is attached to the plate. The piece of board or plate is about 18 inches long by about 5 inches wide and about ½ inch thick.

To operate the present invention, open an awning of a recreational vehicle and pull it into a generally extended position. Place the hook over the barrel rod of the awning, and pull the rope and wood out and down. Adjust the rope so that the piece of wood rests on the ground at approximately a 30-degree angle. Next, loosen the knob on the truss. Stand under the awning, place one foot on the board, and push down on it. As the board is pushed toward the ground, its movement will cause the awning to tighten. When it is taut, tighten the adjustment knob to hold it in place. Once the awning is tight, just remove the present invention and put it away until its use is required again.

Unlike the usual method of tightening an awning, which requires two people, this device enables just one person to tighten it. When the awning is tightened using this method, the annoying noise caused by it flapping in the wind is eliminated.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. An awning system comprising, in combination:

a recreational vehicle positioned upon a recipient surface and with the recreational vehicle having an upstanding supporting surface thereon;

an awning further comprising:

a generally rectangular cover having an inboard extent and an outboard extent bounded by an inboard portion, an outboard portion, and a pair of opposed side edges extended therebetween and with the inboard portion thereof coupled to the supporting surface of the recreational vehicle at an upper extent thereof; and a telescopically adjustable elongated truss having an inboard end removably coupled to the supporting surface of the recreational vehicle at a lower extent thereof, an outboard end removably coupled to an outboard portion of the cover, and an adjustment knob therebetween;

a rectangular planar rigid plate having an upper surface, a lower surface, and a periphery interconnecting the surfaces formed of a short front edge, a short back edge, and a pair of opposed long side edges extended therebetween, the plate further having a central axis formed therethrough and extended perpendicularly between the front edge and the back edge, a characteristic thickness, a width that is at least ten times greater than the thickness, a length that is at least 36 times greater than the thickness, and a through hole formed thereon at a location aligned with the central axis and with the through hole offset toward the front edge to thereby define a stepping area upon the upper surface between it and the rear edge, the rear edge of the plate positioned upon the recipient surface and the front edge of the plate extended upwards to thereby create an acute angle of about thirty degrees between the lower surface and the recipient surface;

a rigid hook having a curved upper extent and a lower extent with an eyelet formed thereon and with the upper extent removably coupled to an outer portion of the cover of the awning; and a piece of flexible non-extendable rope disposed within the through hole of the plate, the rope having a knot at one end positioned in contact with the lower surface of the plate, a loop formed at the other end coupled with the eyelet of the hook, and an intermediate taut portion therebetween, whereby when a user's foot is placed upon the stepping area and then applies a downward force, the hook pulls the outboard portion of the cover of the awning downwards for allowing telescopic adjustment of the truss.

* * * * *